(12) United States Patent
Ito

(10) Patent No.: US 6,377,882 B1
(45) Date of Patent: *Apr. 23, 2002

(54) VEHICLE CONTROL APPARATUS HAVING POWER SOURCE AND CONTINUOUSLY VARIABLE TRANSMISSION, AND CONTROL METHOD OF THE APPARATUS

(75) Inventor: Yasushi Ito, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/528,992

(22) Filed: Mar. 20, 2000

(30) Foreign Application Priority Data

Apr. 6, 1999 (JP) .......................................... 11-099251

(51) Int. Cl.$^7$ ......................... G06H 17/00; F16H 59/74
(52) U.S. Cl. ............................... 701/51; 701/64; 701/54; 477/102; 477/109
(58) Field of Search ................................. 701/51, 54, 55, 701/56, 64, 66; 477/37, 43, 48, 102, 109

(56) References Cited

U.S. PATENT DOCUMENTS

| | | | |
|---|---|---|---|
| 4,911,275 A | | 3/1990 | Ohkumo et al. .......... 192/0.076 |
| 5,050,455 A | | 9/1991 | Yamashita et al. ............ 74/866 |
| 5,188,005 A | * | 2/1993 | Sankpal et al. ............... 74/866 |
| 5,199,399 A | | 4/1993 | Shibuya ....................... 123/339 |
| 5,484,351 A | | 1/1996 | Zhang et al. ................ 477/113 |
| 5,658,217 A | * | 8/1997 | Tsukada ...................... 477/109 |
| 5,672,138 A | | 9/1997 | Mikami et al. .............. 477/111 |
| 5,685,800 A | | 11/1997 | Toukura ....................... 477/90 |
| 5,954,776 A | * | 9/1999 | Saito et al. .................... 701/51 |
| 5,967,940 A | | 10/1999 | Yamaguchi .................. 477/107 |
| 6,009,365 A | | 12/1999 | Takahara et al. .............. 701/54 |
| 6,063,003 A | * | 5/2000 | Kubota et al. ................ 477/43 |
| 6,159,128 A | * | 12/2000 | Sasaki et al. ............... 477/143 |
| 6,174,261 B1 | | 1/2001 | Watanabe et al. ............. 477/43 |
| 6,272,414 B1 | | 8/2001 | Takahashi .................... 701/54 |

FOREIGN PATENT DOCUMENTS

| | | |
|---|---|---|
| EP | 0 530 381 | 3/1993 |
| JP | 6-109120 | 4/1994 |
| JP | 7-293649 | 11/1995 |
| JP | 8-177997 | 7/1996 |
| JP | 11-5460 | 1/1999 |
| JP | 11-20512 | 1/1999 |

* cited by examiner

Primary Examiner—Jacques H. Louis-Jacques
Assistant Examiner—Brian J. Broadhead
(74) Attorney, Agent, or Firm—Oblon, Spivak, McClelland, Maier & Neustadt, P.C.

(57) ABSTRACT

A control apparatus for a vehicle that has a power source and a continuously variable transmission. If a backlash-reducing control execution flag is on, a central control section utilizes an inertia torque produced during a backlash-reducing control as a part of a transient surge-reducing control that follows the backlash-reducing control, by setting at least one of a control duration and a control torque of the transient surge-reducing control to a value that is less than the control duration or torque set for an ordinary transient surge-reducing control. Therefore, the vehicle control apparatus is able to effectively perform the transient surge-reducing control and therefore further reduce vibrations of the vehicle.

13 Claims, 5 Drawing Sheets

FIG. 5C VEHICLE ACCELERATION

VEHICLE CONTROL APPARATUS HAVING POWER SOURCE AND CONTINUOUSLY VARIABLE TRANSMISSION, AND CONTROL METHOD OF THE APPARATUS

INCORPORATION BY REFERENCE

The disclosure of Japanese Patent Application No. HEI 11-99251 filed on Apr. 6, 1999 including the specification, drawings and abstract is incorporated herein by reference in its entirety.

BACKGROUND OF THE INVENTION

1. Field of the Invention

The present invention relates to a vehicle control apparatus having a power source and a continuously variable transmission that is capable of continuously changing the speed transfer ratio and a vehicle control method. More particularly, the invention relates to a control apparatus that performs a control to reduce front-rear vibrations of a vehicle occurring, for example, at the time of a state change of the vehicle from a decelerating state to an accelerating state, and a vehicle control method.

2. Description of the Related Art

It is known that the body of a vehicle having a continuously variable transmission experiences a front-rear vibration at the end of a speed shift to a higher speed transfer ratio of the continuously variable transmission that is performed on the basis of an acceleration request or an output power increase request made by, for example, a depression of an accelerator pedal or the like. Such vibration, generally termed bucking or transient surge, is caused by inertia torque, an elasticity of a power transmitting system, and the like. More specifically, when the speed transfer ratio of the continuously variable transmission is increased upon an acceleration request or an output increase request to the power source such as an engine or the like, the rotational speed of a rotating body involved in power transmission changes, thereby producing inertia torque in accordance with the amount of rotational speed change of the rotating body (angular acceleration) and the inertia moment. The inertia torque is released when the rotational speed of the rotating body stabilizes at a target speed, that is, approximately at the time of the end of the speed shift. As a result, the released inertia torque temporarily increases the driving torque, so that a front-rear vibration occurs due to the deflection elasticity of the power transmission system.

Japanese Patent Application Laid-Open No. HEI 11-5460 describes a control apparatus for reducing transient surges as described above. The control apparatus calculates a half period of a transient surge (vehicle front-rear vibration) that is expected to occur at the end of a speed shift, on the basis of the output torque of the engine and the speed transfer ratio of the continuously variable transmission. Between the time point preceding the end of the speed shift by the half period of the vehicle front-rear vibration and the end of the speed shift, the control apparatus sets the torque provided for the wheel side to a half of a target torque. Subsequently, the control apparatus increases the torque to the target torque in a stepped manner. As a result, during the duration between the time point preceding the end of the speed shift by the half period and the end of the speed shift, about half the inertia torque is released. After the speed shift ends, the remaining inertia torque is released in the form of a vibration whose phase is opposite to that of the vehicle front-rear vibration, so that the inertia torque offsets the vehicle front-rear vibration. In this manner, the control apparatus reduces transient surges.

However, the control performed by the above-described control apparatus is a theoretical control based on an ideal model in which no backlash or the like exits in the drive power transmitting system including the differential device and the like. In reality, a vehicle has a great number of non-linear factors (e.g., impacts caused by backlashes of gears, splines, and the like of the drive power transmitting system). Backlashes in the drive power transmitting system have great effect, particularly when the power transmitting state changes from a driven state in which the power source side (including the engine, the continuously variable transmission and the like) is driven by wheels connected to the continuously variable transmission to a driving state in which the output of the power source side is transmitted to the wheel and therefore drives the wheels. The kinetic energy stored by movements in backlash is instantly transferred at the sites of impacts at the change from the aforementioned driven state to the aforementioned driving state. Corresponding to the impacts, the transmission timing of the output of the power source side deviates. Therefore, even if the above-described transient surge-reducing control apparatus is applied to an actual vehicle, there occur impacts at unintended timings, deviation of the timing of the vibration reducing control, and the like, so that the control apparatus fails to sufficiently reduce the vehicle front-rear vibrations. As a result, an occupant in the vehicle is occasionally annoyed or discomforted. A control apparatus disclosed in Japanese Patent Application Laid-Open No. HEI 11-33613 avoids backlash movements, if any backlash space exits, by adjusting the torque output of the power source side or the torque adjusting control duration in such a direction as to fill in or eliminate the backlash spaces. After eliminating the backlash spaces, the control apparatus performs a control of reducing a transient surge as described above. Therefore, the control apparatus is able to effectively reduce the vehicle front-rear vibrations.

However, at the time of the start of the above-described backlash-reducing control, a relative movement between the power source side and the wheel side is started and, therefore, an inertia torque is produced. Therefore, the control apparatus described in Japanese Patent Application Laid-Open No. HEI 11-33613 cannot fully establish the state of the ideal model assumed in Japanese Patent Application Laid-Open No. HEI 11-5460, so that the application of the above-described theoretical control results in insufficient reduction of vehicle front-rear vibrations. Thus, the control apparatus described in Japanese Patent Application Laid-Open No. HEI 11-33613 still has a problem of annoying or discomforting an occupant in the vehicle in a subtle but unignorable manner.

SUMMARY OF THE INVENTION

Accordingly, it is an object of the invention to provide a control apparatus and a control method for a vehicle having a power source and a continuously variable transmission wherein even if a backlash-reducing control and a transient surge-reducing control are performed in combination, the transient surge-reducing control can be effectively performed to further reduce vibrations of the vehicle.

To achieve the aforementioned and other objects, one aspect of the invention provides a vehicle control apparatus including a power source, and a continuously variable transmission capable of continuously varying a speed transfer ratio. When the power source and the continuously variable transmission change from a driven state to a driving state with respect to a wheel side, the vehicle control apparatus performs a backlash-reducing control that substantially eliminates a backlash present in a power transmitting system so as to reduce a vibration of a vehicle caused by the backlash, and subsequently performs a transient surge-reducing control that increases, in a stepped manner, a control torque applied to the wheel side so as to reduce the vibration of the vehicle by controlling an output torque of the power source and the speed transfer ratio of the continuously variable transmission based on a natural vibration frequency of the vehicle. In that case, the vehicle control apparatus sets an initial control duration of the transient surge-reducing control following the backlash-reducing control to a duration that is shorter than a half of a natural vibration period of the vehicle, based on a control amount of the backlash-reducing control.

Another aspect of the invention provides a vehicle control apparatus including a power source, and a continuously variable transmission capable of continuously varying a speed transfer ratio. When the power source and the continuously variable transmission change from a driven state to a driving state with respect to a wheel side, the vehicle control apparatus performs a backlash-reducing control that substantially eliminates a backlash present in a power transmitting system so as to reduce a vibration of a vehicle caused by the backlash, and subsequently performs a transient surge-reducing control that increases, in a stepped manner, a control torque applied to the wheel side so as to reduce the vibration of the vehicle by controlling an output torque of the power source and the speed transfer ratio of the continuously variable transmission based on a natural vibration frequency of the vehicle. In that case, the vehicle control apparatus sets the control torque applied during an initial performance of the transient surge-reducing control following the backlash-reducing control to a value that is smaller than ½ of a desired target torque by a predetermined amount, based on a control amount of the backlash-reducing control. The control torque is then increased to the target torque in a stepped manner.

The aforementioned "backlash" is a clearance provided for force-transmitting gear or spline portions. The size of each backlash provided at various sites is known at the time of designing a power transmitting system. The aforementioned "eliminates a backlash" means that a clearance between tooth faces of gear or spline portions in a force-transmitting direction is gradually reduced until they contact each other, so as to avoid impactive collision between the tooth faces, for example, when the power source and the continuously variable transmission change from the driven state to the driving state with respect to the wheel side. The "transient surge-reducing control" is is a control that releases the inertia torque in a stepped manner and produces a vibration that has a phase opposite to that of the transient surge and therefore cancels out the transient surge by increasing the torque of the drive wheels in a stepped manner through control of the output torque of the power source and the speed transfer ratio of the continuously variable transmission.

The vehicle control apparatus as described above reduces the control amount (torque or control duration) applied for the transient surge-reducing control in accordance with the control amount provided by the backlash-reducing control. More specifically, the apparatus reduces the control amount of the transient surge-reducing control by an amount corresponding to a relative movement between the power source side and the wheel side that has already started, so as to utilize an extraneous amount of torque provided by the backlash-reducing control as a part of the transient surge-reducing control. In this manner, the control amount of the transient surge-reducing control is corrected as a whole to an appropriate value, so that front-rear vibrations of the vehicle can be favorably reduced or restrained.

A vehicle control method according to still another aspect of the invention includes a backlash-reducing control step of, when the power source and the continuously variable transmission change from a driven state to a driving state with respect to a wheel side, substantially eliminating a backlash present in a power transmitting system so as to reduce a vibration of the vehicle caused by the backlash, and a step of, subsequently to the backlash-reducing control step, increasing, in a stepped manner, a control torque applied to the wheel side so as to reduce the vibration of the vehicle by controlling an output torque of the power source and the speed transfer ratio of the continuously variable transmission based on a natural vibration frequency of the vehicle, during a duration that is set based on a control amount of the backlash-reducing control and that is shorter than a half of a natural vibration period of the vehicle.

A vehicle control method according to a further aspect of the invention includes a backlash-reducing control step of, when the power source and the continuously variable transmission change from a driven state to a driving state with respect to a wheel side, substantially eliminating a backlash present in a power transmitting system so as to reduce a vibration of the vehicle caused by the backlash, a torque setting step of, subsequently to the backlash-reducing control step, setting a torque that is produced by controlling an output torque of the power source and the speed transfer ratio of the continuously variable transmission based on a natural vibration frequency of the vehicle and that is applied to a wheel side, to a value that is smaller than ½ of a desired target torque by a predetermined amount, based on a control amount of the backlash-reducing control, and a step of, at least a predetermined length of time following the torque setting step, increasing the control torque applied to the wheel side to the target torque in a stepped manner.

Therefore, in a case where a backlash-reducing control that substantially eliminates a backlash present in a power transmitting system so as to reduce or restrain a vibration of a vehicle caused by the backlash is followed by a transient surge-reducing control that increases, in a stepped manner, a control torque applied to the wheel side so as to reduce the vibration of the vehicle by controlling an output torque of the power source and the speed transfer ratio of the continuously variable transmission, based on a natural vibration frequency of the vehicle, the method is able to utilize the inertia torque produced during the backlash-reducing control as a part of the transient surge-reducing control so as to effectively perform the transient surge-reducing control. Hence, the vibration of the vehicle can be further reduced.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein:

FIG. 5C is a diagram indicating changes in the vehicle acceleration occurring during the backlash-reducing control and the transient surge-reducing control according to the embodiment.

DETAILED DESCRIPTION OF PREFERRED EMBODIMENT

A preferred embodiment of the invention will be described hereinafter with reference to the accompanying drawings.

Figure 1:
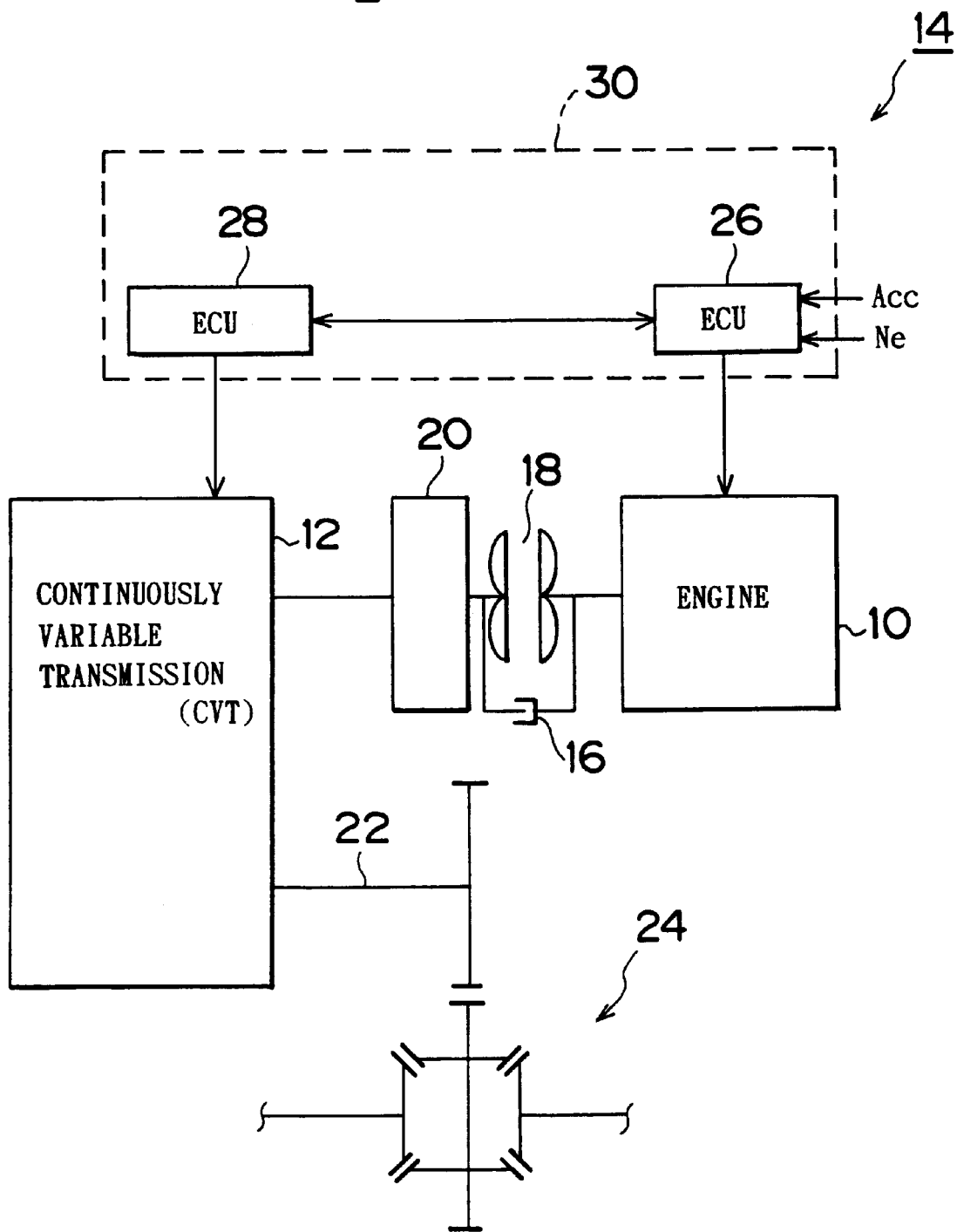
FIG. 1 is a schematic block diagram of a construction of a vehicle control apparatus according to a preferred embodiment of the invention.

FIG. 1 is a schematic illustration of a construction of a vehicle control apparatus 14 according to the embodiment of the invention that includes an engine 10 and a continuously variable transmission 12. In a vehicle according to this embodiment, the continuously variable transmission 12 is connected to an output side of the engine 10. The continuously variable transmission (hereinafter, referred to as "CVT") 12 is a transmission that is capable of continuously varying the speed transfer ratio. The CVT 12 may be, for example, a belt type CVT that changes the running radii of a belt on a driving pulley and a driven pulley to perform a speed shift by hydraulically changing the groove width of each pulley, a toroidal CVT in which power rollers are sandwiched between a pair of discs having toroidal surfaces and the power rollers are tilted to change the radial distance of points of contact of the power rollers with each disc from its rotating axis, or the like. Since the belt type CVT shifts the speed transfer ratio by changing the groove width of each pulley while maintaining a constant tension on the belt, the groove width changing rate is equivalent to the speed shifting rate. Therefore, the speed shifting rate can be controlled freely by controlling the hydraulic pressure supplied to and discharged from an actuator for driving a movable sheave of each pulley.

As shown in FIG. 1, a torque converter 18 having a lockup clutch 16, and a forward-reverse switching mechanism 20 are disposed between the engine 10 and the CVT 12. The torque converter 18 basically allows the engine 10 to continuously operate even while the vehicle is stopped. The forward-reverse switching mechanism 20 is provided because the direction of revolution of the engine 10 is restricted to one direction and because the CVT 12 does not have a reverse mechanism. The forward-reverse switching mechanism 20 may be, for example, a mechanism formed mainly by a planetary gear set, a mechanism having a reverse gear and a synchronous coupling device, or the like.

An output shaft 22 of the CVT 12 is connected to a differential 24 via gears. Therefore, when the lockup clutch 16 of the torque converter 18 is engaged, it is possible to transmit the output from the engine 10 to a wheel side via the CVT 12 and, furthermore, allow the engine 10 to be driven (driven state) by the wheel side supplying torque to the CVT 12. When the lockup clutch 16 is disengaged, the engine 10 is allowed to operate autonomously. Backlashes exit in the differential 24.

The vehicle control apparatus 14 further includes a central control section 30 having electronic control units (ECUs) 26, 28. The ECUs 26, 28 are each formed mainly by a microcomputer. An engine ECU 26 receives data regarding the accelerator pedal depression Acc, the engine revolution speed Ne and the like, and controls the engine 10 with respect to the amount of fuel injected therein, the fuel injection timing, the amount of intake air, and the like. The other ECU 28 controls the speed shifting rate and the rotational speed of the CVT 12 and the like based on data exchanged with the engine ECU 26. More specifically, the ECUs 26, 28 control the output of the engine 10 and the speed transfer ratio and the speed shifting rate of the CVT 12 in accordance with input data and pre-stored programs.

The backlashes present in the differential 24 are clearances that are provided for smooth mesh of tooth faces of gear portions, spline portions and the like as described above. When the driving and driven sides are switched between the combination of the engine 10 and the CVT 12 provided at one side of the vehicle control apparatus 14 and the wheels disposed at the opposite side of the vehicle control apparatus 14, that is, when the direction of force transmission therebetween reverses, the presence of backlashes causes temporary discontinuation of force transmission followed by impactive force transmission, so that an acceleration shock occurs. Such a shock produces a vehicle front-rear vibration, and impedes the transient surge control for reducing the front-rear vibration, and the like. In the embodiment described below, the vehicle control apparatus 14 performs a backlash control of filling in (or eliminating) the backlashes before performing the transient surge control for reducing the vehicle front-rear vibration during vehicle speed control.

The basic principles of the transient surge control and the backlash control, which are preconditions for the embodiment, will be described below.

Figure 2A:
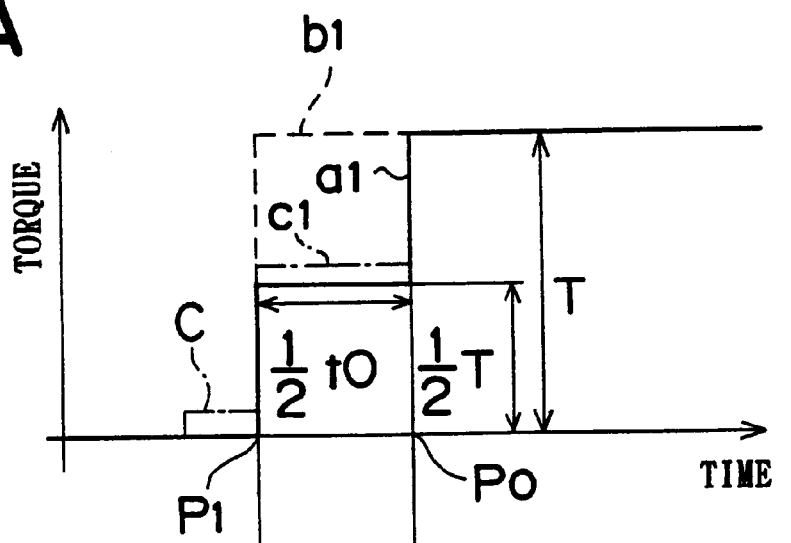
FIG. 2A is a diagram indicating torque changes occurring during a backlash-reducing control and a transient surge-reducing control according to a conventional art.
Figure 2B:
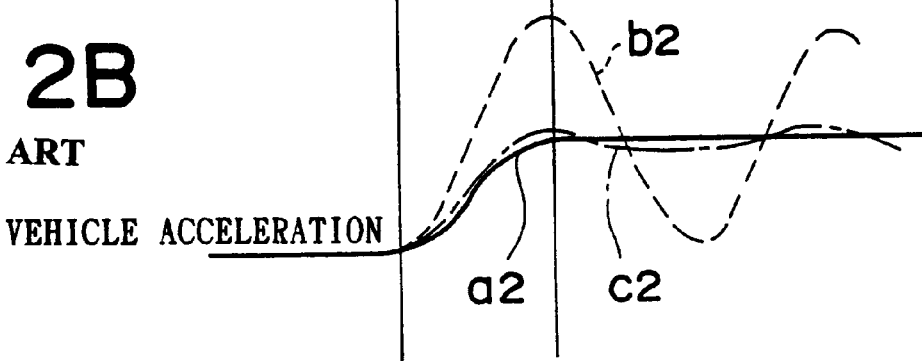
FIG. 2B is a diagram indicating changes in the vehicle acceleration occurring during the backlash-reducing control and the transient surge-reducing control according to the conventional art.

First described will be the transient surge control performed in a case where there is no backlash in the drive power transmitting system, or after the backlash eliminating operation has been completed. The central control section 30 shown in FIG. 1 recognizes the change from a decelerating state (where the engine side is driven by drive force from the wheel side) to an accelerating state (where the wheel side is driven by drive force from the engine side) by, for example, detecting an off-state of an idle switch (that turns on when the accelerator pedal is not depressed). Based on the output torque of the engine 10 and the speed transfer ratio of the CVT 12, the central control section 30 calculates the half period of a transient surge (vehicle front-rear vibration) that is expected to occur at the end of a speed shift. As indicated in FIGS. 2A and 2B, the central control section 30 restricts the applied torque to a half (T/2) of a target torque T between a time point P1 preceding the end P0 of a speed shift by the half period of the vehicle front-rear vibration and the end point P0 of the speed shift. After that, the central control section 30 changes the torque in a stepped manner to the target torque as indicated by a solid line a1 in FIG. 2A. As a result, the vehicle acceleration changes as indicated by a solid line a2 in FIG. 2B between the time point P1 and the time point P0. That is, between the time point preceding the end of the speed shift by the half period and the end of the speed shift, about half the inertia torque is released. After the end point of the speed shift, the remaining inertia torque is released in the form of a vibration whose phase is opposite to that of the transient surge, so that the inertia torque substantially cancels out the transient surge. In this manner, the control apparatus reduces the transient surge. If the torque is immediately increased to the target torque T as indicated by a broken line b1 in FIG. 2A, a vehicle front-rear vibration occurs as indicated by a broken line b2 in FIG. 2B.

If there is a backlash in the drive power transmitting system, the central control section 30 eliminates the backlash (that is, gradually reduces the clearance between tooth faces of gear or spline portions in a force transmitting direction until they contact each other) in order to avoid impactive collision between the tooth faces. This backlash eliminating operation can establish a state substantially the same as the aforementioned state where there is no backlash. For that purpose, an amount of torque exactly sufficient to eliminate the backlashes is first produced. More specifically, in order to avoid the aforementioned impactive collision during a change from the driven state where the engine 10 and the CVT 12 receive drive force from the wheel (vehicle wheel) side to the driving state where the side of the engine 10 and the CVT 12 delivers drive force to the wheel (vehicle wheel) side, it is necessary that the engine side revolve at a higher speed than the wheel (vehicle wheel) side and, therefore, the engine 10 produce a torque that is needed to maintain such a higher revolution speed. Since the amount of backlash present in the drive power transmitting system of the vehicle is known at the stage of designing the drive power transmitting system, a backlash-reducing torque and a backlash-reducing control duration can easily be determined with reference to a pre-stored map related to the amount of backlash. In FIG. 2A, a one-dot chain line c indicates the backlash-reducing torque and the backlash-reducing control duration. The backlash-reducing control is also started, for example, when the central control section 30 detects the off-state of the idle switch. Through the backlash-reducing control, the tooth faces and the like that define the backlashes gradually engage (softly touch), so that an impact in the driving power transmitting system is avoided. Therefore, vehicle-vibrating factors are reduced.

Subsequently to the backlash-reducing control, the transient surge-reducing control is performed by adding ½ of the target torque T to the backlash-reducing torque in a stepped manner, as indicated by a one-dot chain line c1 in FIG. 2A. Therefore, as indicated by a one-dot chain line c2 in FIG. 2B, it becomes possible to reduce the vehicle front-rear vibration and bring the accelerating state of the vehicle closer to the ideal state (indicated by the solid line a2). The reason why a small vibration occurs during and after the transient surge-reducing control as indicated by the one-dot chain line c2 is that due to the backlash-reducing control prior to the transient surge-reducing control, a relative movement between the power source side (including the engine 10 and the CVT 12) and the wheels has started and, therefore, an inertia torque has been produced, as stated above.

A feature of this embodiment is that during the transient surge-reducing control immediately following the backlash-reducing control, the inertia torque produced by the relative movement caused during the backlash-reducing control is taken into account by adjusting the transient surge-reducing torque and the transient surge-reducing control duration, so that the amount of control performed by the transient surge-reducing control is corrected to an appropriate value considering the effect achieved by the entire control process so as to bring the acceleration state of the vehicle even closer to the ideal state.

Figure 3:
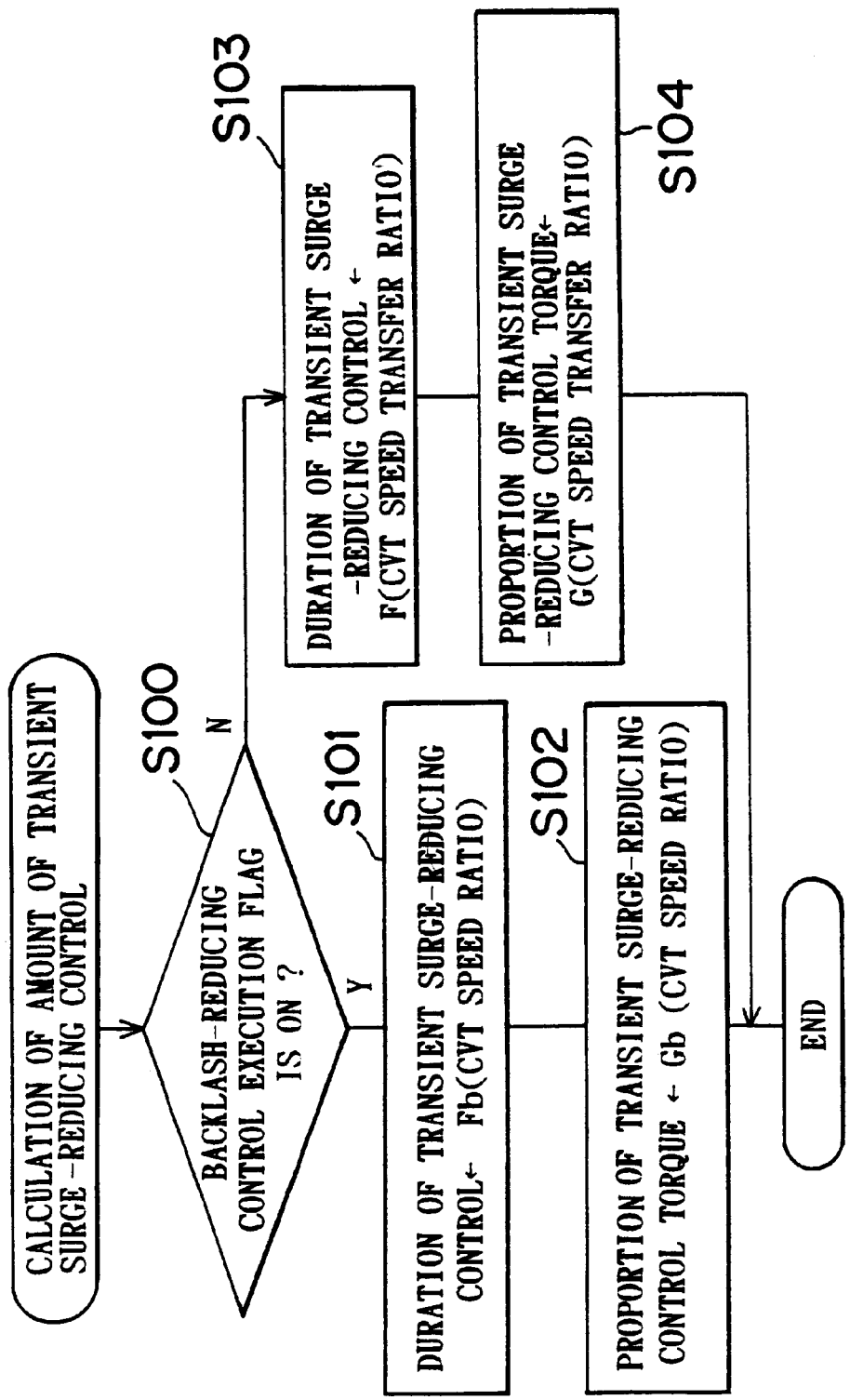
FIG. 3 is a flowchart illustrating a control procedure according to the embodiment of the invention.

FIG. 3 is a flowchart illustrating a procedure of calculating the amount of transient surge-reducing control. In step S100, the central control section 30 shown in FIG. 1 checks whether a backlash-reducing control execution flag for indicating execution of the backlash-reducing control is in an on-state. The backlash-reducing control execution flag is provided for indicating that the backlash-reducing control has been started, as indicated in FIG. 5B. That is, the backlash-reducing control execution flag turns on simultaneously with start of the backlash-reducing control, and then turns off at an appropriate timing (for example, during the initial execution of the transient surge-reducing control after the backlash-reducing control).

Figure 4A:
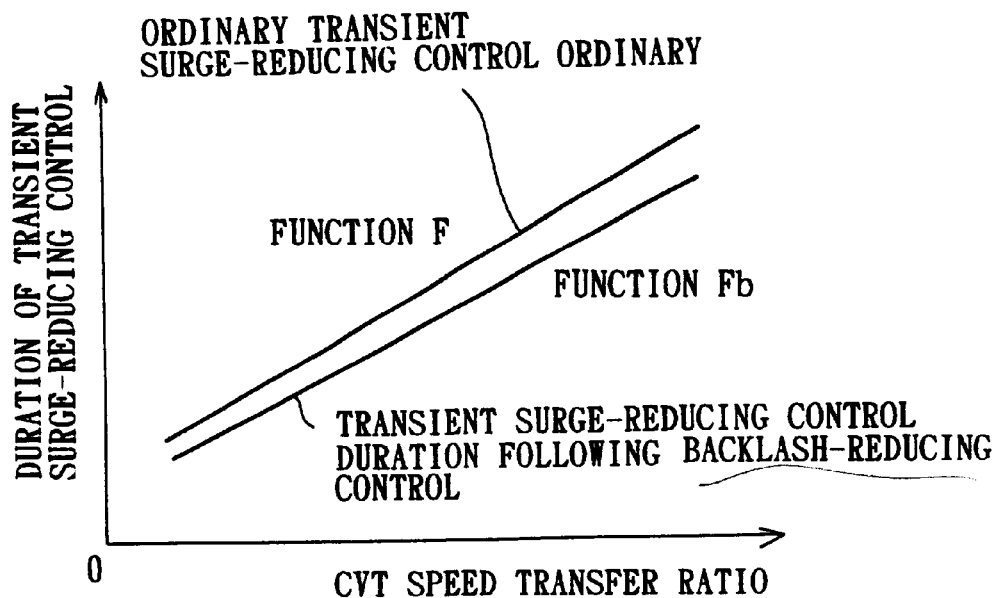
FIG. 4A is a diagram indicating a map of correspondence of the transient surge-reducing control duration to the CVT speed transfer ratio.

If it is confirmed in step S100 that the backlash-reducing control execution flag is on, the central control section 30 determines a transient surge-reducing control duration based on a function Fb indicated by a prestored map of a relationship between the transient surge-reducing control duration and the CVT speed transfer ratio as illustrated in FIG. 4A, in step S101. Since the amount of backlash-reducing control is known beforehand, the amount of inertia torque produced during the backlash-reducing control can be calculated. Therefore, if the transient surge-reducing control is performed considering the inertia torque, the inertia torque produced during the backlash-reducing control can be utilized as a part of the transient surge-reducing control. More specifically, the central control section 30 determines a duration of the transient surge-reducing control following the backlash-reducing control, based on the speed transfer ratio of the CVT 12 at the present time point and the function Fb. The thus-determined duration is shorter, by an amount corresponding to the inertia torque produced during the backlash-reducing control, than the duration of the transient surge-reducing control that would be determined by a function F if the transient surge-reducing control were not preceded by the backlash-reducing control. The function Fb is set so as to determine a value of the transient surge-reducing control duration that is less by, for example, about 5 to 10%, than the value determined by the function F, which is set for a case where the backlash does not need to be considered.

Figure 4B:
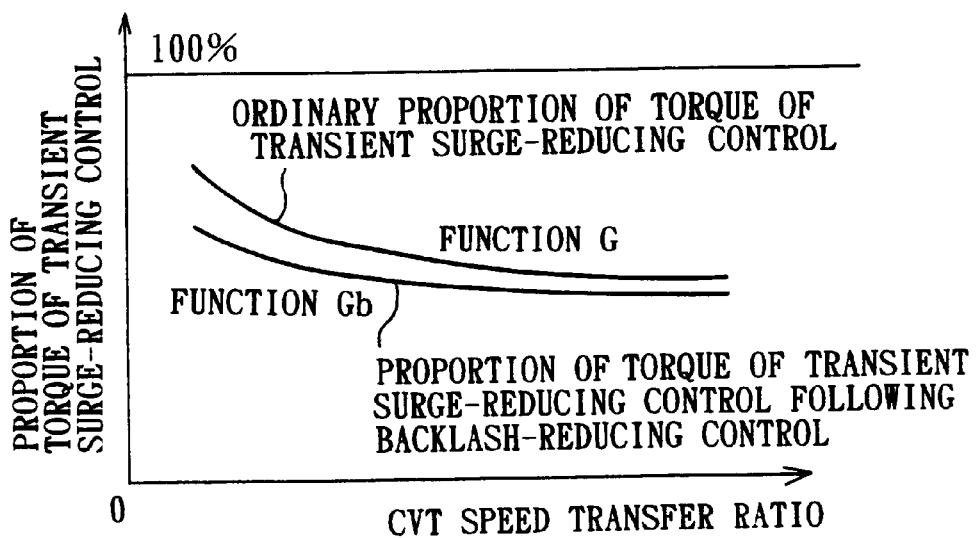
FIG. 4B is a diagram indicating a map of correspondence of the transient surge-reducing control torque to the CVT speed transfer ratio.

Subsequently in step S102, the central control section 30 determines a transient surge-reducing control torque based on a function Gb indicated by a pre-stored map of a relationship between the transient surge-reducing control torque and the CVT speed transfer ratio as illustrated in FIG. 4B. In this case, too, in order to utilize the inertia torque produced during the backlash-reducing control as a part of the transient surge-reducing control, the central control section 30 determines a torque that is to be applied during the transient surge-reducing control following the backlash-reducing control, based on the speed transfer ratio of the CVT 12 at the present time point and the function Gb, which is set so as to determine a value of the applied torque that is less than the value determined by a function G that is set for use in a case where the transient surge-reducing control is not preceded by the backlash-reducing control. In this embodiment, the function Gb is set so as to determine values of the transient surge-reducing control torque that are less than the values determined by the function G set for the case where the backlash does not need to be considered, by, for example, about 5 to 10% in accordance with the amount of backlash, which is known at the time of setting the functions.

Figure 5A:
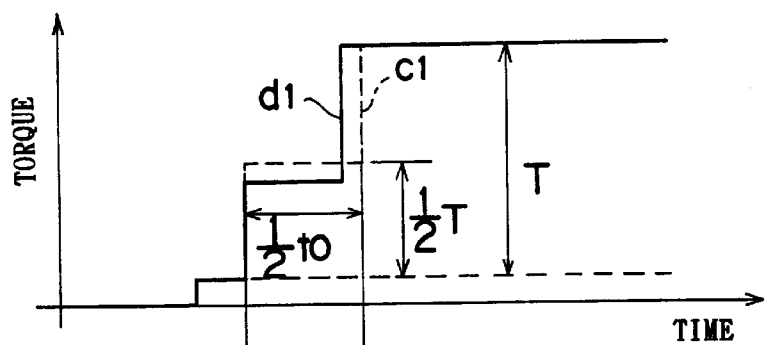
FIG. 5A is a diagram indicating torque changes occurring during a backlash-reducing control and a transient surge-reducing control according to the embodiment.
Figure 5B:
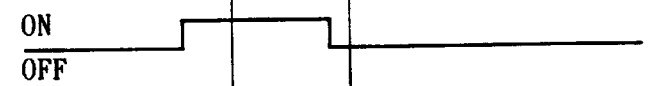
FIG. 5B is a diagram indicating state changes of a backlash-reducing control execution flag occurring during the backlash-reducing control and the transient surge-reducing control according to the embodiment.
Figure 5B:
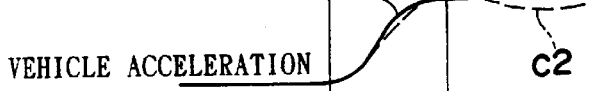

FIG. 5A indicates (by a solid line d1) a relationship between the transient surge-reducing control duration and the transient surge-reducing control torque applied in a case where the on-state of the backlash-reducing control execution flag is confirmed. FIG. 5c indicates changes in the vehicle acceleration (by a solid line d2) occurring in that case. For comparison, broken lines c1, c2 in FIG. 5A and 5C indicate conditions of control occurring in a case where an ordinary transient surge-reducing control follows the backlash-reducing control (the same as indicated by the one-dot chain lines c1, c2 in FIGS. 2A and 2B).

Therefore, if a predetermined torque is applied for a predetermined duration for the sake of the backlash-reducing control before the transient surge-reducing control, it is possible to utilize the inertia torque produced during the backlash-reducing control as a part of the control amount of the transient surge-reducing control by setting a control duration of the transient surge-reducing control that is shorter than the control duration needed for the ordinary transient surge-reducing control and applying a control torque that is less than the control torque that needs to be applied for the ordinary transient surge-reducing control, as indicated in FIG. 5A. Therefore, it becomes possible to perform a vibration-reducing control in which an influence of extraneous inertia torque does not appear.

If it is determined in step S100 that the backlash-reducing control execution flag is not on, which means, for example, a case where the initial execution of the transient surge-reducing control has already ended and where after the force transmitting state has changed to the driving state where the engine 10 and the CVT 12 deliver power to the wheel (vehicle wheel) side, the accelerator pedal is further depressed so that the speed transfer ratio of the CVT 12 is changed, the central control section 30 determines in step S103 an ordinary transient surge-reducing control duration based on the function F indicated by the pre-stored map of the relationship between the transient surge-reducing control duration and the CVT speed transfer ratio as illustrated in FIG. 4A, since the inertia torque produced during the backlash-reducing control is eliminated by the initial execution of the transient surge-reducing control. Subsequently in step S104, the central control section 30 determines a transient surge-reducing control torque based on the function G indicated by the pre-stored map of the relationship between the transient surge-reducing control torque and the CVT speed transfer ratio as indicated in FIG. 4B. Then, the central control section 30 increases the torque so that the vehicle speed reaches a speed in accordance with the amount of depression of the accelerator pedal. In this case, the vehicle acceleration changes as indicated by the solid line a2 in FIG. 2B.

Although this embodiment adjusts both the transient surge-reducing control duration and the transient surge-reducing control torque in order to utilize the inertia torque produced during the backlash-reducing control as a part of the transient surge-reducing control, such inertia torque can also be utilized by adjusting only one of the transient surge-reducing control factors. This manner of control achieves substantially the same advantages as achieved by the embodiment.

Furthermore, in the foregoing description, adjustment of the transient surge-reducing control duration and the transient surge-reducing control torque in accordance with the operational conditions of vehicle-installed devices and the like that affect the torque of the engine 10 is not considered. In an actual vehicle, however, the output of a power source and the duration of control thereof are affected by the friction in the power source. That is, the load on the engine 10 varies depending on the operational conditions of the vehicle, for example, the engine revolution speed, the engine-cooling water temperature, the engine oil temperature, and the like. Furthermore, the load on the engine 10 also varies depending on the operational conditions of auxiliary devices and the like (for example, an air conditioner, an alternator, headlights, a power steering, or an electric power generator in the case of a hybrid vehicle). Therefore, the torque of the engine 10 and the duration of production of the torque needed to restrain a certain amount of transient surge vary depending on the operational conditions in the entire vehicle. Therefore, in order to perform appropriate transient surge-reducing control, it is necessary to select an appropriate magnitude of engine-produced torque and an appropriate duration of torque production, that is, appropriate transient surge-reducing control variables, in accordance with the conditions in the entire vehicle. That is, since the toque of the engine 10 varies depending on the operational conditions of the vehicle-installed devices or appliances, such as an air conditioner, an alternator and the like, it is desirable to set the function Fb and the function Gb in accordance with the operational conditions of the vehicle-installed devices and the like.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. A vehicle control apparatus in a vehicle having a power source and a continuously variable transmission, comprising a vehicle vibration reducer including:

a backlash-reducing control portion designed so that when the power source and the continuously variable transmission change from a driven state to a driving state with respect to a wheel side, the backlash-reducing control portion performs a backlash-reducing control that substantially eliminates a backlash present in a power transmitting system so as to reduce a vibration of the vehicle caused by the backlash, and a transient surge-reducing control portion that subsequently performs a transient surge-reducing control that increases, in a stepped manner, a control torque applied to the wheel side so as to reduce the vibration of the vehicle by controlling an output torque of the power source and a speed transfer ratio of the continuously variable transmission based on a natural vibration frequency of the vehicle, wherein the vehicle vibration reducer sets an initial control duration of the transient surge-reducing control following the backlash-reducing control to a duration that is shorter than a half of a natural vibration period of the vehicle, based on a control amount of the backlash-reducing control.

2. A vehicle control apparatus according to claim 1, wherein the vehicle vibration reducer determines the initial control duration of the transient surge-reducing control following the backlash-reducing control, based on a factor that affects friction of the power source.

3. A vehicle control apparatus according to claim 1, wherein the vehicle vibration reducer sets the control torque applied to the wheel side during the initial control duration of the transient surge-reducing control following the backlash-reducing control, to a value that is less than ½ of a predetermined target torque, based on the control amount of the backlash-reducing control.

4. A vehicle control apparatus according to claim 3, wherein the vehicle vibration reducer determines the control torque applied to the wheel side during the initial control duration of the transient surge-reducing control following the backlash-reducing control, based on a factor that affects friction of the power source.

5. A vehicle control apparatus according to claim 1, wherein an inertia torque produced during the backlash-reducing control is utilized as a portion of the control torque used for the transient surge-reducing control.

6. A vehicle control apparatus according to claim 1, wherein the control duration of a transient surge-reducing control performed after the initial control duration of the transient surge-reducing control ends is set longer than the initial control duration of the transient surge-reducing control, based on the speed transfer ratio of the continuously variable transmission.

7. A vehicle control apparatus according to claim 1, wherein the control torque for a transient surge-reducing control performed after the initial control duration of the transient surge-reducing control ends is set greater than the control torque applied during the initial control duration of the transient surge-reducing control, based on the speed transfer ratio of the continuously variable transmission.

8. A vehicle control apparatus in a vehicle having a power source and a continuously variable transmission, comprising a vehicle vibration reducer including:
   a backlash-reducing control portion designed so that when the power source and the continuously variable transmission change from a driven state to a driving state with respect to a wheel side, the vehicle vibration reducer performs a backlash-reducing control that substantially eliminates a backlash present in a power transmitting system so as to reduce a vibration of the vehicle caused by the backlash, and a transient surge-reducing control portion that subsequently performs a transient surge-reducing control that increases, in a stepped manner, a control torque applied to the wheel side so as to reduce the vibration of the vehicle by controlling an output torque of the power source and a speed transfer ratio of the continuously variable transmission based on a natural vibration frequency of the vehicle,
   wherein the control torque applied during an initial performance of the transient surge-reducing control following the backlash-reducing control is set to a value that is smaller than ½ of a desired target torque by a predetermined amount, based on a control amount of the backlash-reducing control, and then the control torque is increased to the target torque in a stepped manner.

9. A vehicle control apparatus according to claim 8, wherein the vehicle vibration reducer determines the torque applied to the wheel side during an initial control duration of the transient surge-reducing control following the backlash-reducing control, based on a factor that affects friction of the power source.

10. A vehicle control apparatus according to claim 8, wherein the control torque for the transient surge-reducing control performed after the initial performance of the transient surge-reducing control ends is set greater than the control torque applied during the initial control duration of the transient surge-reducing control, based on the speed transfer ratio of the continuously variable transmission.

11. A vehicle control apparatus according to claim 8, wherein an inertia torque produced during the backlash-reducing control is utilized as a portion of the control torque used for the transient surge-reducing control.

12. A control method for a vehicle having a power source and a continuously variable transmission that continuously varies a speed transfer ratio, comprising:
   a backlash-reducing control step of, when the power source and the continuously variable transmission change from a driven state to a driving state with respect to a wheel side, substantially eliminating a backlash present in a power transmitting system so as to reduce a vibration of the vehicle caused by the backlash; and
   a step of, subsequently to the backlash-reducing control step, increasing, in a stepped manner, a control torque applied to the wheel side so as to reduce the vibration of the vehicle by controlling an output torque of the power source and the speed transfer ratio of the continuously variable transmission based on a natural vibration frequency of the vehicle, during a duration that is set based on a control amount of the backlash-reducing control and that is shorter than a half of a natural vibration period of the vehicle.

13. A control method for a vehicle having a power source and a continuously variable transmission that continuously varies a speed transfer ratio, comprising:
   a backlash-reducing control step of, when the power source and the continuously variable transmission change from a driven state to a driving state with respect to a wheel side, substantially eliminating a backlash present in a power transmitting system so as to reduce a vibration of the vehicle caused by the backlash;
   a torque setting step of, subsequently to the backlash-reducing control step, setting a torque that is produced by controlling an output torque of the power source and the speed transfer ratio of the continuously variable transmission based on a natural vibration frequency of the vehicle and that is applied to a wheel side, to a value that is smaller than ½ of a desired target torque by a predetermined amount, based on a control amount of the backlash-reducing control; and
   a step of, at least a predetermined length of time following the torque setting step, increasing the control torque applied to the wheel side to the target torque in a stepped manner.

* * * * *